United States Patent [19]

Sanborn et al.

[11] Patent Number: 4,476,194
[45] Date of Patent: Oct. 9, 1984

[54] CONTOUR FORMING CONICAL SHAPES

[75] Inventors: Harold C. Sanborn, Bolton; James B. Griffith, Ellington, both of Conn.

[73] Assignee: United Technologies Corporation, Hartford, Conn.

[21] Appl. No.: 440,673

[22] Filed: Nov. 10, 1982

[51] Int. Cl.³ .......................................... B23K 31/08
[52] U.S. Cl. .................................. 428/585; 428/595; 72/171; 228/158
[58] Field of Search ................... 228/152, 158, 173 R, 228/173 C; 72/167, 170, 171, 136; 428/595, 585

[56] References Cited

U.S. PATENT DOCUMENTS

| | | | |
|---|---|---|---|
| 2,674,294 | 2/1953 | Ekberg | 153/61 |
| 2,815,790 | 12/1957 | Mayrath | 72/136 |
| 3,287,953 | 11/1966 | Boldrini | 72/171 |
| 3,623,349 | 11/1971 | Häusler | 72/169 |
| 3,737,979 | 6/1973 | Rakich | 228/158 |
| 3,999,416 | 12/1976 | Brooks | 72/69 |
| 4,195,509 | 4/1980 | Herburg | 72/167 |

FOREIGN PATENT DOCUMENTS 736838 9/1955 United Kingdom ................. 72/136

OTHER PUBLICATIONS

"Rolling of Rings", W. Johnson and A. G. Mamalis, International Metals Reviews, 1979, No. 4, pp. 137–148.
Metals Handbook, 8th Edition, vol. 4, p. 222, American Society for Metals, Metals Park, Ohio.

Primary Examiner—Kenneth J. Ramsey
Assistant Examiner—Marc Hodak
Attorney, Agent, or Firm—C. G. Nessler

[57] ABSTRACT

A truncated conical segment is made by the steps of longitudinally welding two pieces of metal, then contour rolling the weldment to preferentially reduce one of the pieces of the weldment more than the other. This provides a skewed trapezoid shape which is then 3-roll formed into a ring having a conical shape. The angle of the cone is a function of the preferential reduction in the second contour rolling step.

6 Claims, 6 Drawing Figures

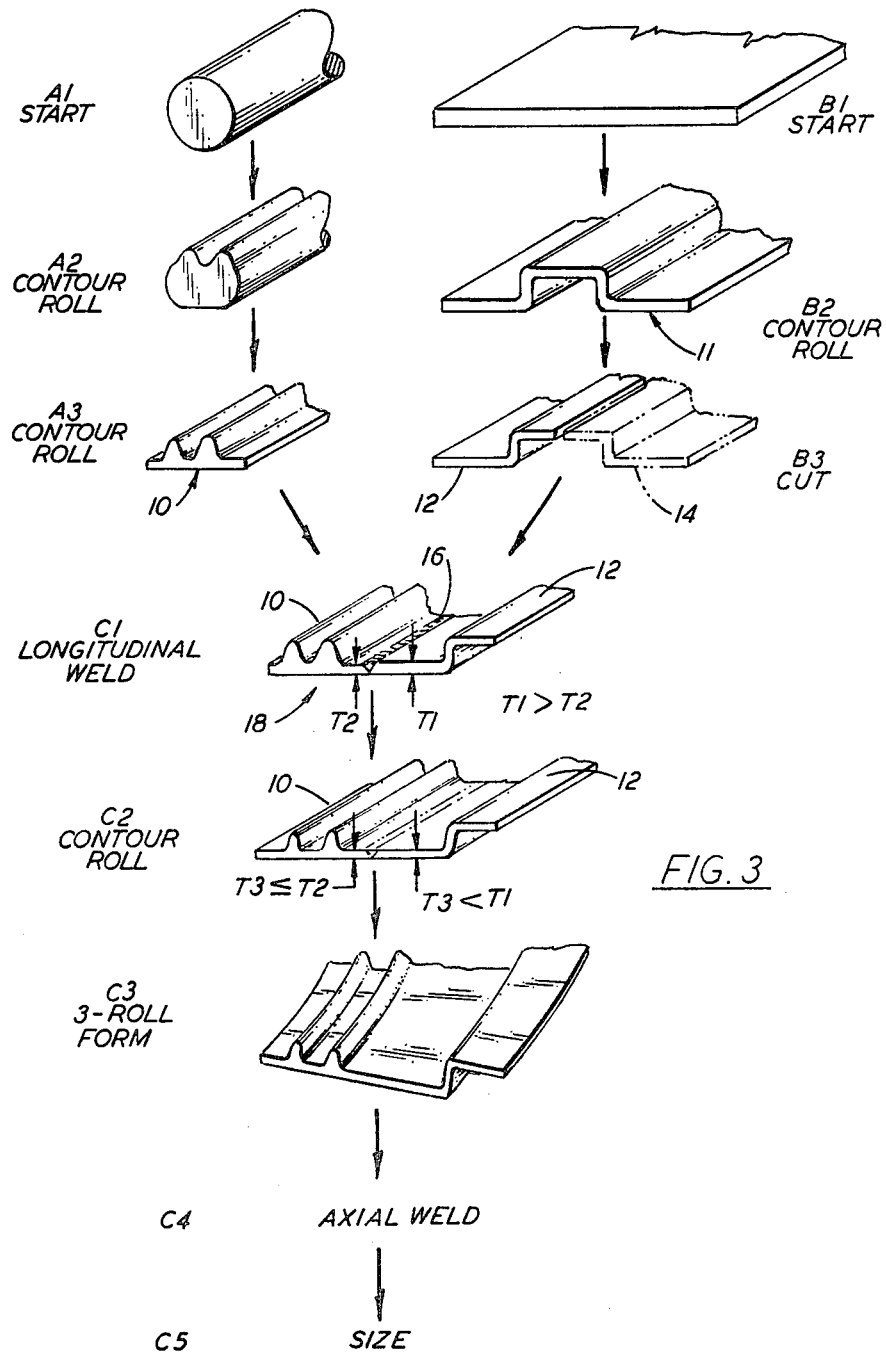

CONTOUR FORMING CONICAL SHAPES

DESCRIPTION

1. Technical Field

The present invention relates to the field of metalworking, more particularly to the forming of complex cross section conical metal rings.

2. Background Art

There are many manufactured articles in which ring shaped metal structures are used. When the finished rings are relatively thin walled, there can be considerable waste of material during the machining if the initial preform is made to an inefficient shape. For this reason, it is seldom preferred that the starting structure be a portion of billet or plate. More typically, the starting structure is a piece of forged or wrought material, a casting, or a weldment.

The problem of producing relatively fragile ring shaped structures is particulrly evident in the manufacture of gas turbine engines. In this type of machine, the metals tend to be difficult to work because of their required high strength properties. In addition, for aircraft applications the rings are often very thin to reduce weight. This means that the use of even relatively close tolerance forgings and castings can produce considerable machining waste.

Consequently, ring rolling techniques are often used to make ring preforms. Most generally, this comprises forming a relatively crude first ring shape and then rolling the shape in the appropriate machine to change its diameter and cross section to nearly that which is desired. The starting material for the first ring shape is most commonly a forging or other form of wrought material such as a pierced plate. Also quite common is the practice of taking a piece of bar stock, rolling it into a ring of a first diameter and butt welding the ends of the bar where they meet. In the ring rolling to a second larger diameter the weld is inherently and desirably worked simultaneously with the original material.

Machines for ring rolling are described generally in the technical literature. U.S. Pat. No. 3,999,416 to Brooks is particularly concerned with the forming of contoured rings usable in gas turbine engines. The technique disclosed by Brooks comprises particular successive cold rolling operations between a multiplicity of contoured dies.

Making conical sections is more difficult than making straight cylinder sections. By way of example, the most common way to make a truncated cone of flat sheet metal is to cut a shaped preform from a flat sheet, and then to use a 3-roll or 4-roll mill to form the ring. See Metals Handbook, 8th Edition, Vol. 4, page 222, American Society for Metals, Metals Park, Ohio, and U.S. Pat. Nos. 4,195,509 to Herburg, 3,623,349 to Hausler and 3,279,229 to Lagher.

It has been said that flat-section rolling of metals is still an art rather than a science, having been adequately analyzed only in the last 30 years. Ring rolling confronts one with somewhat more complicated geometry than flat sections and therefore most aspects of the plasticity mechanics of cylindrical ring forming are not presently known. See "Rolling of Rings" by W. Johnson et al, International Metal Reviews 1979, No. 4 Page 137–148. Accordingly, since there is no "science" of the making of conical rolled rings, artful improvements are much desired insofar as wasting as little material as possible and achieving the greatest economy possible.

DISCLOSURE OF THE INVENTION

An object of the invention is to provide an efficient way of making a truncated sheet metal cone; where the cross section of the article is contoured to relatively precise dimensions. A further object of the invention is to provide a method for forming nickel superalloys into shapes suited for the construction of liners for gas turbine combustors.

Generally, the invention involves longitudinally form rolling a workpiece so that one portion of the cross section is reduced more than the opposing portion. This produces a skewed trapezoidal shape which when 3-roll formed into a ring will have the shape of a cone.

According to the preferred practice of the invention, two sections of straight stock are joined by a longitudinal weld, each section having a particular previously formed contour. By way of example, a T-shaped cross section bar stock may be joined to a piece of flat plate. Then the weldment is longitudinally rolled by passing it through contour rolls which reduce one section more than the other section. For example, the first section might be reduced 10% while the second stock section might be reduced by 30%. The contour of the cross section of the weldment which issues from the contour rolling mill will be substantially that contour which is desired in a rolled ring. During the contour rolling step the weld zone will be desirably reduced in cross section to aid in improving its properties. Because of the different amounts of reduction, the workpiece issuing from the contour rolling mill will be longer at one longitudinal edge than it is on the opposing longitudinal edge. Next, the workpiece is made circular, such as by passing it through a conventional 3-roll mill. By progressively closing the space between the rolls during repetitive passes, a ring will be formed and the ends will approximately abut. The shape of the now circular workpiece will approximate a truncated cone. Preferably, the ends of the cone overlap and they are carefully trimmed and welded. The welded cone is then rerolled or otherwise sized to its final desired dimension, depending on the precision required.

Any approximate shape of cone can be produced by varying the relative reductions in area at the opposing longitudinal pieces of the workpiece prior to its being made circular after contour rolling. The differential in percentage reduction will be approximately reflected in the differential in lengths of the corresponding sides. The cone angle will be determined accordingly.

The invention requires relatively uncomplex contour rolls which are not subjected to the scuffing which characterizes some alternative methods. In addition, the method allows the use of low cost mill forms as starting materials and enables good circumferential weld properties to be achieved.

The foregong and other objects, features and advantages of the present invention will become more apparent from the following description of preferred embodiments and accompanying drawings.

BRIEF DESCRIPTION OF THE DRAWINGS

FIG. 3 shows the sequential steps in the practice of the invention.

BEST MODE FOR CARRYING OUT THE INVENTION

The present invention is described in terms of the construction of a conical segment of a combustor liner for a gas turbine engine, such as is described in U.S. Patent Application Ser. No. 227,317 now U.S. Pat. No. 4,380,906 filed on January 22, 1981 by J. A. Dierberger. However, it will be appreciated that the invention will be useful in the manufacture of conical sheet metal segments for other applications as well.

Combustor liners are made of high temperature superalloys. The invention is illustrated in the manufacture of a liner segment made from the alloy Hastelloy X (by weight percent 22Cr, 18.5Fe, 1.5Co, 0.10C, 0Mo, 0.6W, balance Ni). As will be evident, the invention will be useful with any material which may be roll formed and welded to itself, including certain non-metals.

Figures 1, 2:
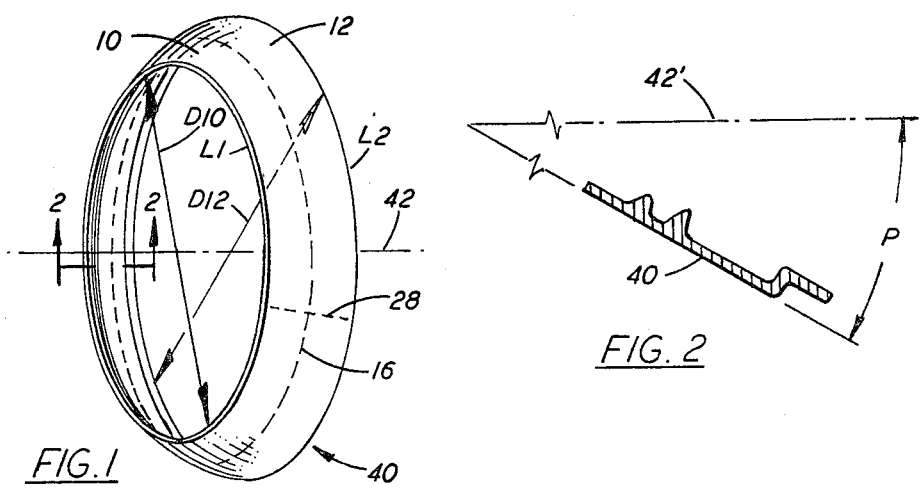
FIG. 1 shows a combustor liner segment having the shape of a truncated cone made in the practice of the invention.
FIG. 2 is a cross section through the structure shown in FIG. 1.

Combustor liners are annular shaped structures which can be comprised of a series of mating truncated conical segments. See U.S. Pat. Nos. 4,077,205 and 3,978,662. The shape of a typical combustor liner 40 is shown in FIG. 1. The conical angle may vary; as defined herein the conical angle is half the included angle of the cone, having a value of the angle P between the cross section of the liner 40 and centerline 42' shown in FIG. 2. Typically, the conical angle of combustors ranges up to 35°. Based on the development to date, the invention herein will be at least useful for conical segments having angles up to 54°.

The following is an example of the preferred practice of the invention when making a conical liner having a cross section like that shown in FIGS. 1 and 2. The steps of manufacture are illustrated in FIG. 3. Generally, conventional mill starting shapes are used; they are contour rolled to a first set of precision dimensions, then welded to each other, contour rolled again, and then formed into a circular shape which comprises a truncated cone. Referring to the sequence A in FIG. 3, a 16 mm diameter round bar at A1 is contour rolled in steps A2 and A3 to a particular cross sectional shape 10. The contour rolling is done in a multiplicity of passes through a conventional two-high rolling mill; annealing at 1150° C. (1) hour is intermittently used to ease the task and avoid working fracture in the metal. When the piece 10 is compared at step A3 to its condition at step A1 the cross sectional area is substantially reduced and of course the length of the piece is accordingly increased substantially. As is well known, the nature of contour rolling may be characterized by this result. In the Figure, the lateral dimension of the piece in step A3 is increased by about 20% over the width which the part had in step A1.

In similar fashion, a piece of flat strip shown at step B1 is contour rolled to a flanged channel section 11 as shown at B2. Next, the section is axially slit or sawed as shown at B3 to form the section into two separate pieces 12 and 14. Piece 12 is used in the succeeding steps while piece 14 may be used to make another assembly.

At step C1, the piece 12 is butt welded to the piece 10, along a lengthwise weld joint 16, thereby forming the weldment workpiece 18. Very importantly, in the preceding operations the thickness T1 of the piece for 12 was made thicker than the thickness T2 of the piece 10, both thicknesses being those measured in the vicinity of the weld joint. Filler is added to the weld to make the weld zone essentially of a thickness T1, as needed to obtain good working of the weld.

Figure 4:
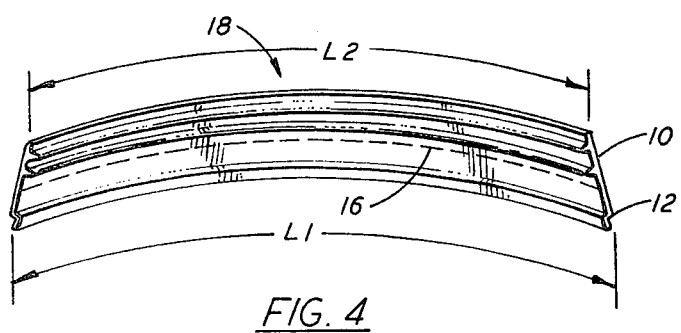
FIG. 4 shows the elementary shape of the part produced as a result of step C3 shown in FIG. 3.

The workpiece 18 is then passed through contour rolls which are shaped to provide a cross sectional shape which is very nearly that desired in the final article (other than it might be modified somewhat in the preferred or optional steps mentioned below). In this contour rolling step C1 the thickness T1 of piece 12 is substantially reduced to a new thickness T3, preferably slightly less than T2. Alternatively stated, the cross sectional area of the section 10 is reduced only by a relatively small amount, or not at all, while the cross section of the piece 12 is substantially reduced. This results in a skewed (curved) trapezoidal workpiece 18 having a length L1 at the section 12 side which is longer than the length L2 at the section 10 side as shown in FIG. 4. It is possible to reduce substantially the cross section of the piece 10 in step C2, so long as the cross section of the piece 12 is reduced by a greater amount.

We have found that a single contour rolling pass is all that is needed to progress from the configuration shown in step C1 to that shown in step C2, when T3 is about 75% of T1. Multiple rolling steps with annealing might be used as required by the amount of reduction and the material properties. As an example of this part of the invention, the dimension T2 would be 1.4 mm while the dimension T1 would be 1.65–1.78 mm. After the completion of the C2 step, the thickness T3 would be about 1.27 mm. For a workpiece which had a length of about 3.04 m, and an overall width of about 3.7 cm, the length L1 would be made relatively about 12% bigger than the length L2. The resultant cone angle will be nominally a reflection of the change in lengths and the width dimension of the workpiece. The observation is that the proportion of length changes of opposing section edges is somewhat less than the proportion of cross section reduction. This is a function of the complex dynamics of metal flow in working the non-uniform cross section workpiece. Resonable experiment with particular workpieces will establish the relationship between the initial and final dimensions of the workpiece in step C2.

Figures 5, 6:
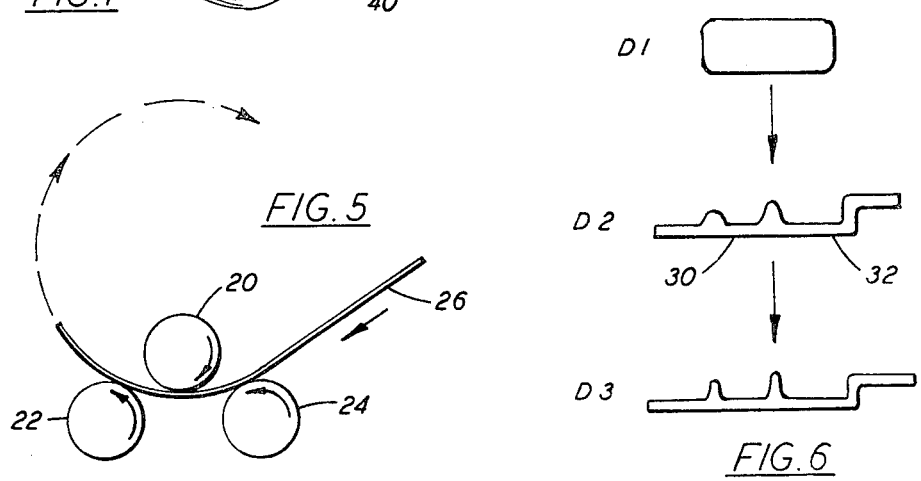
FIG. 5 illustrates 3-roll forming of the piece shown in FIG. 4, to make it into a circle.
FIG. 6 illustrates an alternate embodiment of the invention wherein welding is not used.

In the next step C3, the part is passed through a 3-roll or 4-roll apparatus. This is a conventional ring-forming apparatus, as illustrated in FIG. 5. The roll 20 is progressively moved closer to the fixed rolls 22, 24 during successive passes of the workpiece 26 through the apparatus. The 3-roll forming is continued until the opposing ends of the workpiece overlap somewhat. Then, the workpiece is removed from the 3-roll machine and the opposing ends are trimmed to the desired circumferential length and then butt welded along an axial joint 28 as shown in FIG. 1 to form the cone 40. Because the length L1 is made previously greater than the length L2, the circular workpiece has the shape of a truncated cone.

The smaller length of the first piece 10 has resulted in a portion of the cone 40 having an average diameter D10 which is smaller than the average diameter D12 of the portion formed from the piece 12. Accordingly, it can be appreciated that the conical angle will be determined by the relative reductions of the two abutting sections 10, 12 of the workpiece 18. Naturally, if a cone having the reverse taper of that just described was desired, the cross sectional area of the piece 10 would be reduced by a greater amount than the cross sectional area of the piece 12.

For applications where good dimensional accuracy is required, such as is the case with combustor liners, the cone formed by the preceding steps can be stretched or shrunk after welding using a machine having an expandable mandrel or collapsible external die. Such a machine is commercially sold, such as Model H180-200 manufactured by Cemco Inc., Louisville, Kentucky U.S.A. Stretch forming will usually be employed to increase the diameter by 0.5-5 percent. Other shaping and forming operations as are known in the prior art may also be used to further alter the dimensions of the cone shape after the longitudinal ends are joined at the axial weld.

It will be readily appreciated by those with skill in the working of sheet metal that simply cutting a trapezoidal shape from flat material and passing the shape through a regular 3-roll mill will not result in a conical shape like that of our invention. While a conical section can be so made by forcing the abutting edges together, the opposing ends of the cone will not lie in opposing planes.

In the manufacture of combustor liners for gas turbine engines, it is important that good properties be achieved along the longitudinal/circumferential weld joint 16 shown in FIGS. 1, 3 and 4. Consequently, the weld thickness is preferably made to comply with the thickness of the section which is being reduced, namely thickness T1 of piece 12 in the Figure. This insures that the weld may be properly worked. Subsequent to step C3, after the workpiece has been welded to form the structure shown in FIG. 1, the liner is heat treated to recrystallize the weld and obtain the desired fatigue properties. There is a criticality in the working and heat treatment of the weld, as is disclosed in more detail in the co-pending application of Sines et al., Ser. No. 440,674, filed on Nov. 10, 1892. Preferably, the cross sectional area of the weld is reduced by at least 20 percent and the weld is heat treated at 1150°-1175° C. for one hour.

Of course, it is not necessary that the workpiece be a weldment in the practice of our essential invention. For instance, as illustrated by FIG. 6 a piece of flat bar stock shown at D1 can be formed by contour rolling to a first shape illustrated at D2. This shape has a first portion 30 and an abutting second portion 32. In the next step D3, the portion 30 is reduced in cross sectional area while the portion 32 is not reduced as much. This makes a cone with a taper the reverse of that described above.

For a shape as complex as we show herein, the procedure shown in FIG. 6 is generally less preferred for two reasons. First, there is undue movement of metal required to make the shape shown at D2. Second, two sets of contour rolls are required, a first set to make the shape shown at D2, and a second set to make the shape shown at D3. In contrast, using the procedure shown in FIG. 3, the same set of contour rolls used in the sequence of step C2 may be used for the separate operations shown in the sequences A and B. In the preferred procedure described for the FIG. 3 sequence it will be appreciated also that the maximum rolling force and the size of rolling mill required will be reduced from that required by the FIG. 6 sequence.

Although this invention has been shown and described with respect to a preferred embodiment, it will be understood by those skilled in the art that various changes in form and detail thereof may be made without departing from the spirit and scope of the claimed invention.

We claim:

1. The method of forming a conical segment from sheet metal characterized by
    (a) providing a first piece of material having a first length, a first cross sectional area and a first thickness;
    (b) butt welding to the first piece of material a second piece of material having a second length, a second cross sectional area and a second thickness greater than the thickness of the first piece, to form a weldment having a weld joint running along the lengths of the abutting pieces;
    (c) rolling the weldment to reduce the cross sectional area of the second piece section more than the cross sectional area of the first piece section, to make uniform the cross section thickness of the conical segment in the vicinity of the weld joint and thereby increase the length of the second piece section more than the length of the first piece section and make the weldment into a skewed shape;
    (d) rolling the skewed shape weldment to form it into a circle so that the opposing lengthwise ends of the weldment come into close proximity, the second piece section thereby forming a portion of a cone which is larger in average diameter compared to the average diameter of the portion comprised of the first piece section.

2. The method of claim 1 characterized by welding the lengthwise ends after the rolling step and then further shaping the cone to a final shape.

3. The method of claim 1 characterized by adding sufficient filler to the weld joint made during step (b) so that the weld has a thickness equal to the thickness of the second section at the end of step (b).

4. The method of claim 1 characterized by contour rolling the first piece of material to a first cross sectional contour shape using a first contour roll; and using the same contour roll in step (c) to roll the weldment, said step (c) insubstantially changing the contour of the first piece and substantially changing the thickness of the second piece and the weld joint therebetween.

5. The method of claim 2 characterized by stretch forming the joined cone shape to expand its average diameter by up to about 5 percent.

6. An article made up by the method of claim 1.

* * * * *

UNITED STATES PATENT AND TRADEMARK OFFICE
CERTIFICATE OF CORRECTION

PATENT NO. : 4,476,194

DATED : October 9, 1984

INVENTOR(S) : Harold C. Sanborn et al

It is certified that error appears in the above-identified patent and that said Letters Patent is hereby corrected as shown below:

On the title page;

In the Abstract, correct the first sentence at lines 1-4 to read "A truncated conical segment is made by the steps of contour rolling two pieces of metal, then longitudinally welding them, followed by contour rolling the weldment to preferentially reduce one of the pieces of the weldment more than the other."

Signed and Sealed this

Twentieth Day of August 1985

[SEAL]

Attest:

DONALD J. QUIGG

*Attesting Officer*     *Acting Commissioner of Patents and Trademarks*